US005445344A

United States Patent [19]
Seger et al.

[11] Patent Number: 5,445,344
[45] Date of Patent: Aug. 29, 1995

[54] REEL-LOCKING DEVICE

[75] Inventors: Peter R. Seger; Michael J. Fanelli, both of Rochester, N.Y.

[73] Assignee: Eastman Kodak Company, Rochester, N.Y.

[21] Appl. No.: 91,502

[22] Filed: Jul. 14, 1993

[51] Int. Cl.[6] ............................................ B65H 75/24
[52] U.S. Cl. ................................................. 242/597.3
[58] Field of Search ................. 242/68, 68.1, 68.2, 242/68.3, 68.5, 72 R, 571.4, 571.5, 577.1, 597.3, 597.5

[56] References Cited

U.S. PATENT DOCUMENTS

| 267,839 | 11/1882 | Cook . | |
|---|---|---|---|
| 872,970 | 12/1907 | Pink . | |
| 902,552 | 11/1908 | Brand | 242/68.3 |
| 1,126,436 | 1/1915 | Fisher . | |
| 1,164,835 | 12/1915 | Mandel . | |
| 1,198,534 | 9/1916 | Grabert et al. . | |
| 1,326,410 | 12/1919 | McMillan . | |
| 1,403,522 | 1/1922 | Pittman . | |
| 1,428,480 | 9/1922 | Giroux . | |
| 1,479,253 | 1/1924 | Rivetta . | |
| 1,507,357 | 9/1924 | Howell | 242/68.3 |
| 1,548,960 | 8/1925 | Stuber et al. . | |
| 1,568,067 | 1/1926 | Howell . | |
| 1,871,235 | 8/1932 | Proctor et al. . | |
| 1,929,160 | 10/1933 | Bellocchio | 242/68 |
| 1,977,354 | 10/1934 | Reynolds | 271/2.3 |
| 3,113,744 | 12/1963 | Nisenson | 242/72 R |
| 3,136,464 | 6/1964 | Schmid | 226/91 |
| 3,275,257 | 9/1966 | Cherniavskyj | 242/68.3 X |
| 3,292,874 | 12/1966 | Tinkham | 242/571.5 |
| 3,385,189 | 5/1968 | Hennig et al. | 95/31 |
| 3,386,673 | 6/1968 | Mader | 242/571.5 X |
| 3,434,675 | 3/1969 | Zuckerman | 242/72 R |
| 3,635,411 | 1/1972 | Petrinjak et al. | 242/1 |
| 3,669,384 | 6/1972 | Hathaway | 242/194 |
| 4,327,874 | 5/1982 | Bruno | 242/571.5 X |
| 4,334,652 | 6/1982 | Blackburn | 242/571.5 X |
| 4,366,932 | 1/1983 | Focke . | |
| 4,432,506 | 2/1984 | Bingaman . | |
| 4,592,522 | 6/1986 | Grant . | |
| 4,615,494 | 10/1986 | Focke et al. . | |
| 4,629,140 | 12/1986 | LaCasse . | |
| 4,664,327 | 5/1987 | Clymer . | |
| 4,709,871 | 12/1987 | Tanaka et al. . | |
| 4,714,210 | 12/1987 | Howell | 242/75.4 X |
| 4,815,675 | 3/1989 | Koizumi . | |

FOREIGN PATENT DOCUMENTS

| 142409 | 5/1949 | Australia . | |
| 1072084 | 12/1959 | Germany . | |
| 821916 | 10/1959 | United Kingdom | 242/72 R |

Primary Examiner—John P. Darling
Attorney, Agent, or Firm—Edward Dugas

[57] ABSTRACT

A reel-locking device comprised of a spindle shaft that has flat elongated surfaces onto which is mounted one or more leaf springs that are compressed as a reel is forced onto the shaft. The force exerted by the leaf spring holds the reel in position with a friction force. Different widths of reels may be accommodated without modifications.

3 Claims, 1 Drawing Sheet

REEL-LOCKING DEVICE

FIELD OF THE INVENTION

This invention relates to the field of reel locks and more particularly to a device for locking reels of different widths to a machine spindle.

BACKGROUND OF THE INVENTION

Presently, in the photographic processing field, there is no requirement to positively secure a reel of film to the various pieces of equipment used in the developing and printing of negative film. Most equipment used today is not affected by relative motion between the supply and take-up spindles of the equipment and actual reels of film. Many spindle designs do provide a feature to ensure that the reel does not "walk" off of the spindle; however, an additional mechanism must be activated and/or engaged to provide this feature. These various designs are also limited to a specific width of reel and are not easily changed over to accommodate a different width reel. Also, the use of any type of tool to either activate a locking mechanism and/or to change over to a different width of reel is frowned upon within the industry. It therefore is desirable to provide a device for securing reels of different widths to a machine spindle which device does not require the use of special tools.

SUMMARY OF THE INVENTION

The present device solves the abovementioned shortcomings of existing designs by providing a positive engagement of the film reels and the machine spindle. The device will also eliminate relative motion between the machine spindle and the actual reel of film. This invention works well with various widths of film reels with no further modifications and/or adjustments being needed to switch from one reel width to another. Also, there are no tools required to operate this device and no additional mechanisms that need to be activated for the reel engagement to be effective.

In the preferred embodiment of the invention there is provided: A reel-locking device comprising:
a spindle shaft; and
at least one leaf spring affixed to said spindle shaft.

From the foregoing it can be seen that it is a primary object of the present invention to provide a reel-locking device that will accommodate reels of different widths.

It is another object of the present invention to provide a reel-locking device that requires no tools to accommodate reels of different widths.

The above and other objects of the present invention will become more apparent when taken in conjunction with the following description and drawings wherein like characters indicate like parts and which drawings form a part of the present invention.

BRIEF DESCRIPTION OF THE DRAWINGS

The drawing illustrates, in perspective view, the reel-locking spindle (including a backing plate) and a phantom film reel.

DETAILED DESCRIPTION OF THE INVENTION

Figure 1:
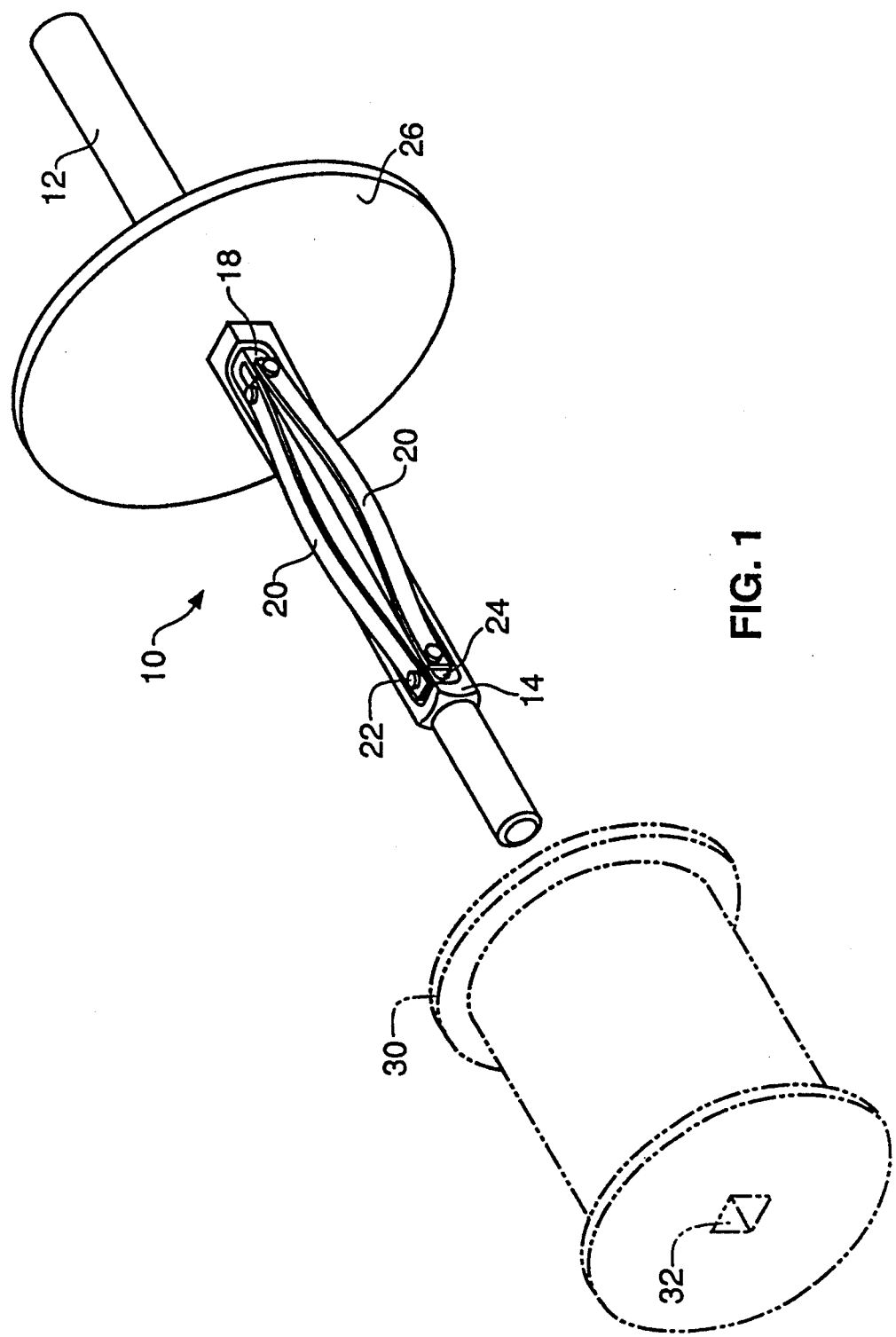

Referring to the drawing, the reel-locking device 10 is comprised in part of a square spindle shaft 12 that matches the opening 32 in a standard film reel 30. The square portion 14 of the shaft 12 is slightly smaller than the opening 32 in the reel 30. The locking mechanism consists of a pair of leaf springs 20 that are mounted 90 degrees apart from each other in recessed areas 18 formed in the square portion 14 of the shaft. The leaf springs 20 are secured to the shaft by two rivets 22. Each leaf spring has one oblong hole 24 to allow the leaf spring lateral motion as it is depressed. When the reel 30 is inserted onto the shaft 12, the leaf springs 20 are depressed and drive the reel against the remaining two square sides of the shaft. The actual locking is achieved by the outward pressure on the reel supplied by the leaf springs. Inherent friction between the two surfaces also prevents the reel from "walking" off of the shaft. A backing plate 26 is affixed to the shaft 12 to limit the travel of the reel 30.

Although reels of different widths are not shown it is clear that they may be used with the present invention as the length of the leaf springs permits the application of a friction holding force along their entire length.

While there has been shown what is considered to be the preferred embodiment of the invention, it will be manifest that many changes and modifications may be made therein without departing from the essential spirit of the invention. It is intended, in the annexed claims, to cover all such changes and modifications as may fall within the true scope of the invention.

Parts List 10. reel-locking device
12. spindle shaft
14. square portion
18. recessed areas
20. leaf spring
22. rivet
24. oblong hole
26. backing plate
30. reel

We claim:

1. A reel-locking device comprising:
   a spindle shaft having a square cross section forming four flat surfaces including at least one recessed surface along one of the four flat surfaces; and
   two or more leaf springs mounted 90° to each other in respective recessed surfaces, each of said two or more leaf springs affixed at one end to said recessed surface for exerting a force against a reel inserted onto said spindle shaft.

2. The reel-locking device according to claim 1 and further comprising:
   a backing plate mounted on said spindle shaft to limit the travel of a reel onto the spindle shaft.

3. A reel-locking device comprising:
   a spindle shaft having a square cross section forming four flat surfaces including at least one recessed surface along one of the four flat surfaces; and
   at least one leaf spring affixed to said recessed surface at one end for exerting a force against a reel inserted onto said spindle shaft, wherein said at least one leaf spring is provided with an oblong opening in the non-affixed end and a fastener means projects through the oblong opening to slidably affix the leaf spring to the recessed surface.

* * * * *